(12) United States Patent
Barclay et al.

(10) Patent No.: US 9,165,423 B2
(45) Date of Patent: *Oct. 20, 2015

(54) INTEGRATING SOCIAL NETWORKING AND WAGERING SYSTEMS

(71) Applicant: WMS Gaming, Inc., Waukegan, IL (US)

(72) Inventors: Brian J. Barclay, Atlanta, GA (US);
Andrew Fowler, Chicago, IL (US);
Andrew C. Guinn, Chicago, IL (US);
Richard B. Robbins, Glenview, IL (US);
Richard T. Schwartz, Deerfield, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,332

(22) Filed: Jan. 17, 2014

(65) Prior Publication Data

US 2014/0135109 A1     May 15, 2014

Related U.S. Application Data

(63) Continuation of application No. 13/499,010, filed as application No. PCT/US2010/050703 on Sep. 29, 2010, now Pat. No. 8,668,590.

(60) Provisional application No. 61/247,185, filed on Sep. 30, 2009.

(51) Int. Cl.
*A63F 9/24* (2006.01)
*G07F 17/32* (2006.01)
(Continued)

(52) U.S. Cl.
CPC ............ *G07F 17/3225* (2013.01); *G06Q 10/10* (2013.01); *G06Q 50/34* (2013.01);
(Continued)

(58) Field of Classification Search
CPC ........................................................ G07F 17/32
USPC .......................................... 463/16, 20, 25, 42
See application file for complete search history.

(56) References Cited

U.S. PATENT DOCUMENTS

2010/0062840 A1* 3/2010 Herrmann ....................... 463/25
2012/0184363 A1   7/2012 Barclay et al.
2013/0225298 A1   8/2013 Hamlin et al.

FOREIGN PATENT DOCUMENTS

JP    2007058494    3/2007
WO   WO-2009042563  4/2009
(Continued)

OTHER PUBLICATIONS

"PCT Application No. PCT/US10/50703 International Preliminary Report on Patentability", Apr. 20, 2012 , 4 pages.
(Continued)

*Primary Examiner* — Omkar Deodhar
(74) *Attorney, Agent, or Firm* — DeLizio Law, PLLC

(57) ABSTRACT

A wagering game system and its operations are described herein. In embodiments, the operations can include connecting a social network account with a wagering game player account, wherein the wagering game player account is associated with a wagering game session, and wherein the social network account is associated with a social networking session via a venue for a social network. The operations can further include detecting a first event from a first of the social networking session and the wagering game session; and after detecting the first event, causing a second event to occur for a second of the social network session and the wagering game session.

21 Claims, 8 Drawing Sheets

(51) Int. Cl.
*G06Q 10/10* (2012.01)
*G06Q 50/34* (2012.01)

(52) U.S. Cl.
CPC ........... *G07F 17/32* (2013.01); *G07F 17/3227* (2013.01); *G07F 17/3232* (2013.01); *G07F 17/3234* (2013.01); *G07F 17/3244* (2013.01)

(56) References Cited

FOREIGN PATENT DOCUMENTS

| WO | WO-2009097538 | 8/2009 |
|---|---|---|
| WO | WO-2009111515 | 9/2009 |
| WO | WO-2011041400 | 4/2011 |

OTHER PUBLICATIONS

"PCT Application No. PCT/US10/50703 International Search Report", Nov. 29, 2010, 9 pages.
"U.S. Appl. No. 13/499,010 Office Action", Jun. 11, 2013, 7 pages.
U.S. Appl. No. 13/594,529, filed Aug. 24, 2012, Hamlin, Vernon W., et al.
"U.S. Appl. No. 13/594,529 Office Action", Dec. 15, 2014, 9 Pages.

\* cited by examiner

INTEGRATING SOCIAL NETWORKING AND WAGERING SYSTEMS

RELATED APPLICATIONS

This application is a continuation application of, and claims priority benefit to, U.S. application Ser. No. 13/499,010 which is a National Stage Application of International Application No. PCT/US10/50703 filed 29 Sep. 2010, which claims priority benefit of Provisional U.S. Application No. 61/247,185 filed 30 Sep. 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

TECHNICAL FIELD

Embodiments of the inventive subject matter relate generally to wagering game systems and networks that, more particularly, integrate social networking and wagering systems.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, roadside casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
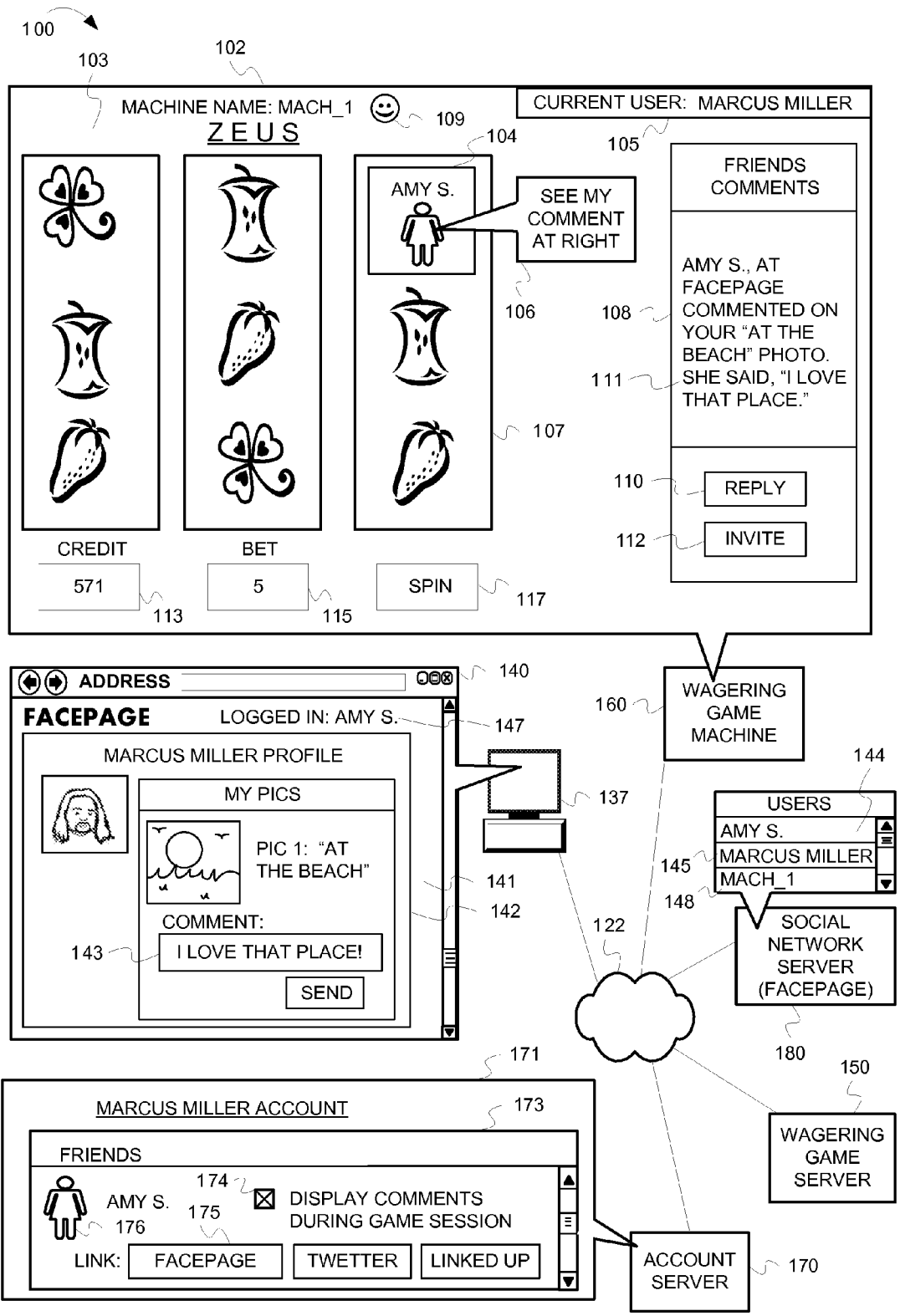
FIG. 1 is an illustration of controlling social interactions between social network accounts and wagering game player accounts during a wagering game session, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Social communication is on the rise. Internet users are enjoying a proliferation of social networking mechanisms (e.g., social networking websites, online chats, blogging, social networking applications, etc.) that are appearing online in vast quantities. Many of those Internet users are also wagering game enthusiasts. Wagering games are also expanding in popularity. Many wagering game enthusiasts are demanding greater access to wagering games and content related to wagering games, especially content that includes social networking. As stated previously, some wagering game companies have created online wagering game websites that provide a way for wagering game enthusiasts to play wagering games while connected to the Internet (e.g., via a web-browser). Some online wagering game websites provide various features, such as some social networking functionality. Social networking features, for example, allow wagering game players ("players") to create user accounts with one or more unique identifiers that represent an online persona. One example of a unique identifier is an "avatar." Avatars are graphical, "cartoon-like" depictions of a social networking persona. These online personas and associated avatars add to the fun of belonging to a social network. Many online casinos, however, present an unsatisfactory wagering game experience to players who enjoy a more integrated gaming experience.

Some embodiments of the inventive subject matter, describe examples of integrating social networking and wagering systems for a network wagering venue (e.g., an online casino, a wagering game website, a wagering network, etc.). Embodiments can be presented over any type of communications network (e.g., public or private) that provides access to wagering games, such as a website (e.g., via wide-area-networks, or WANs), a private gaming network (e.g., local-area-networks, or LANs), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

FIG. 1 is a conceptual diagram that illustrates an example of controlling social interactions between social network accounts and wagering game player accounts during a wagering game session, according to some embodiments. In FIG. 1, a wagering game system ("system") 100 includes a wagering game machine 160 connected to a wagering game server 150 via a communications network 122. Also connected to the communications network 122 are a computer 137, a social network server 180, and an account server 170. The wagering game machine 160 is configured to present a wagering game application 103 in a wagering game display 102. The wagering game application 103 can include wagering game elements, such as one or more reels 107, a credit meter 113, a bet meter 115, a spin button 117, etc. The wagering game machine 160 can also access a player account 171 (e.g., Marcus Miller's player account) stored on the account server 170. The player account 171 can log in to the wagering game machine 160 as indicated by player login information 105.

The computer 137 can access a social network account 144 (e.g., Amy S.'s social network account) stored on the social network server 180. The social network server 180 can host a social networking website 141 (e.g., the fictional social networking website "Facepage"). The social network server 180 can include other devices, servers, mechanisms, etc., that provide functionality (e.g., controls, web pages, applications, etc.) that social network users can use to connect to the social networking website 141 and utilize social networking website features (e.g., communications mechanisms, applications, etc.). The computer 137 can present the social networking website 141 via a web browser application ("web browser") 140. The social network account 144 (e.g., Amy S.'s social network account) can log in to the social networking website 141 through the computer 137, as indicated by social network user login information 147. The computer 137 can present the social networking website 141 in the web browser 140.

The social networking website 141 can present social networking profiles for social networking contacts (e.g., friends, subscribers, etc.) that socialize with the owner of the social network account 144 (e.g., with Amy S.) via the social networking website 141. The social network account 144 can have a number of social networking contacts. For example, the social network user, Amy S., can link the social network account 144 to a separate social network account 145 for a second social network user, Marcus Miller, via the social network server 180. Likewise, the social network account 145 for Marcus Miller is linked to the social network account 144 for Amy S. It should be noted that the social network account 145 is a different account from the player account 171, although Marcus Miller, the user, may own and control both the player account 171 and the social network account 145. Further, although the social network account 144 and the social network account 145 may be linked, they may be linked only as social contacts, so that the users Amy S. and Marcus Miller can receive social communications from and about each other, but each user maintains separate control of his or her own social network account.

On the account server 170, the player account 171 can include a social networking contact list 173 that can show one or more social-network contact accounts from various social networking websites and services. For example, the social networking contact list 173 includes linking controls 175 that link or otherwise associate the social network account 144 (for the social network user Amy S) to the player account 171. Once linked, the player account 171 can show information that identifies the social network account 144 (such as an avatar identifier 176 for Amy S.). The player account 171 can also include options, settings, preferences, etc. for presenting social communications from the social network account 144 during wagering games. For example, the player account 171 includes a comment display control 174 that, when activated, will show social communications from the social network account 144. For example, when the social network account 144 views a profile page 142 for the social network account 145 (e.g., for Marcus Miller's Facepage profile page), a comment feature 143 can present options for the social network account 144 to comment about the social network account 145 (e.g., for Amy S. to comment on a picture posted by Marcus Miller on the profile page 142). The social network server 180 can send a comment made by the social network account 144 (e.g., "I love that place!" sent by Amy S.) to the account server 170 and/or the wagering game server 150. The account server 170 and/or the wagering game server 150 can receive the comment and present it in the wagering game machine 160 to present in the wagering game display 102. The wagering game machine 160 can present the comment in different ways. In one embodiment, the wagering game machine 160 presents the comment in a comment application 108. The comment application 108 may be an integrated feature of the wagering game application 103, or it may be a separate application (e.g., a plug-in, or other "secondary" independent application) that presents comments separate from the wagering game application 103. The comment application 108 can present a comment copy 111 as well as controls to reply to the comment (e.g., reply control 110 to reply to Amy S.) or invite the social network account 144 to participate in gaming activity (e.g., an invite control 112 to invite Amy S. to play a wagering game).

In another embodiment, the wagering game application 103 may communicate with the comment application 108 so that the wagering game application 103 knows that there is a comment. The wagering game application 103 can present notifications of the comment (e.g., via comment notification 106) or integrate the comment (as well as elements of the social network account 144 that made the comment) into the wagering game activity. For example, the wagering game application 103 can present a friend identifier image 104, which can include a name and an avatar for the social network account 144 (e.g., for Amy S.), into the one or more reels 107 or any other playing element for the wagering game application 103.

In some embodiments, as described in further detail herein, the wagering game machine 160 can also have a social network account 148, and social networking identifiers (e.g., a name "Mach_1," an avatar 109, etc.), so that the player account 171, and the social network accounts 144 and 145, can interact and socialize with the wagering game machine 160.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
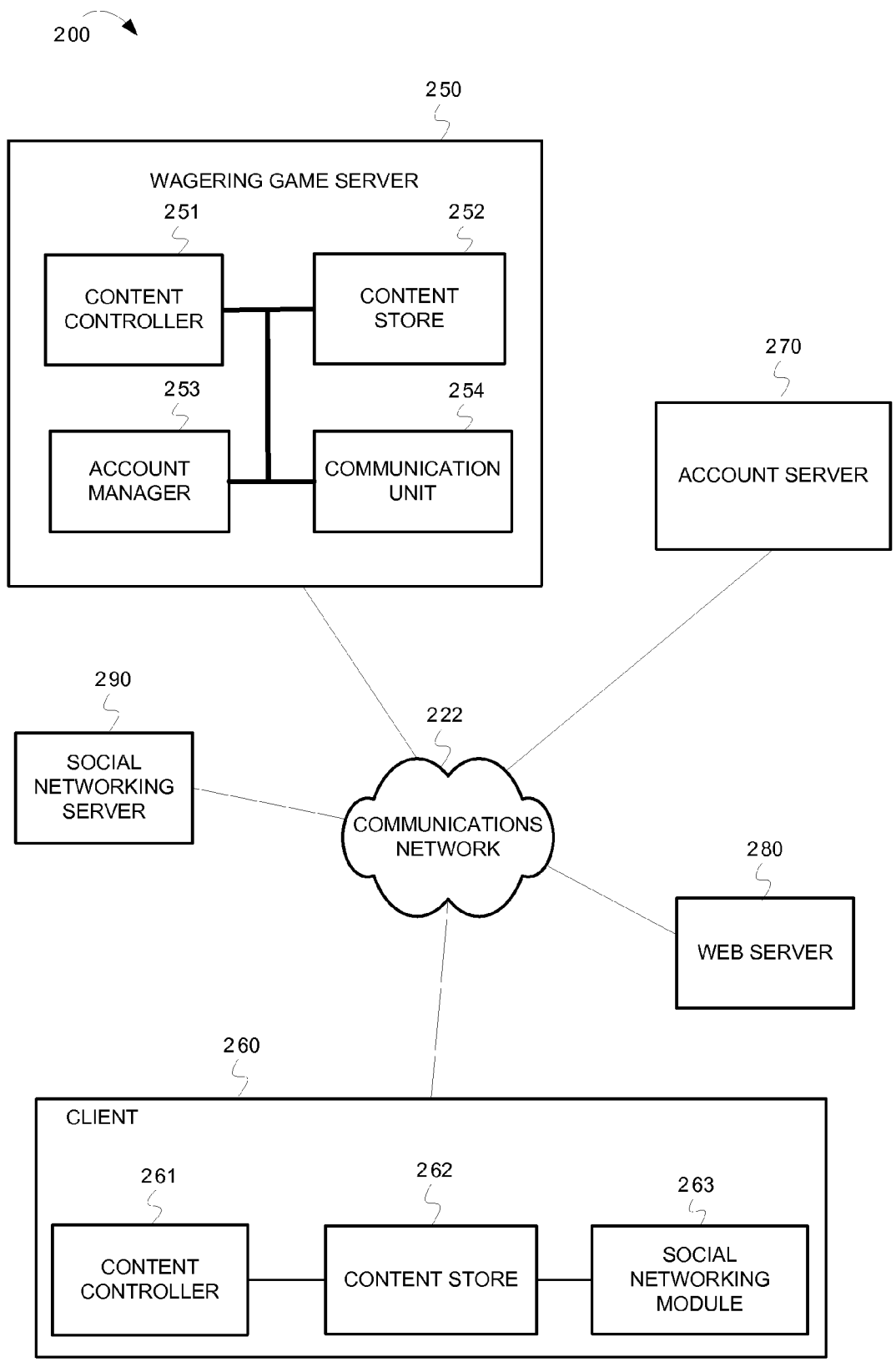
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store wagering game player account information such as account settings (e.g., settings related to social networking contacts, settings related to social communications, etc.), preferences (e.g., player preferences regarding social network accounts and features, player preferences regarding levels of social communication by wagering game machines, player preferences regarding award types, player preferences related to virtual assets, etc.), player profile data (e.g., name, avatar, screen name, etc.), and other information for a player's account (e.g., financial information, account identification numbers, virtual assets, social networking contact information, etc.). The account server 270 can contain lists of social networking contacts referenced by a player account. The account server 270 can also provide auditing capabilities according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a client 260. The wagering game server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the client 260 and to communicate with other systems, devices, and networks.

The wagering game system architecture 200 can also include the client 260 configured to present wagering games and receive and transmit information to integrate social networking and wagering systems. The client 260 can be a computer system, a personal digital assistant (PDA), a cell phone, a laptop, a wagering game machine, or any other device or machine that is capable of processing information, instructions, or other data provided via a communications network 222. The client 260 can include a content controller 261 configured to manage and control content and presentation of content on the client 260. The client 260 can also include a content store 262 configured to contain content to present on the client 260. The client 260 can also include a social networking module 263 configured to communicate with social network accounts associated with wagering game player accounts. The social networking module 263 can also be configured to present events (e.g., achievements, machine occurrences, etc.) associated with the wagering game player account for a wagering game session and communicate the events to the social network account associated with the wagering game player account. The social networking module 263 can also be configured to enable the client 260 to be a social networking contact to the social network account. The client 260 can, thus, perform social communications and other related social networking activities that social networking contacts perform on social networking websites (e.g., link to social network accounts, make comments, build relationships, etc.). The social networking module 263 can interact with social networking websites as a pseudo-user. The social networking module 263 can provide unique identification for the client 260 such as a name, an avatar, and other identifying features that are associated with a social network account. The social networking module 263 can also convey social communications made from social networking communication mechanisms (e.g., social communication features on a social networking website or associated with a social communication application) to the client 260. The social networking module 263 can present the social communications during a wagering game session.

The wagering game system architecture 200 can also include a social network server 290 configured to host social network accounts, provide social networking content, control social networking communications, store associated social networking contacts, etc.

The wagering game system architecture 200 can also include a web server 280 configured to control and present an online website that hosts wagering games. The web server 280 can also be configured to present multiple wagering game applications on the client 260 via a wagering game website, or other gaming-type venue accessible via the Internet. The web server 280 can host an online wagering website and social networking. The web server 280 can include other devices, servers, mechanisms, etc., that provide functionality (e.g., controls, web pages, applications, etc.) that web users can use to connect to a social network website and utilize social networking and website features (e.g., communications mechanisms, applications, etc.). The web server 280 can also be configured to communicate with the client 260 and present data from the client 260 as social communications on the social networking website.

Each component shown in the wagering game system architecture 200 is shown as a separate and distinct element connected via the communications network 222. However, some functions performed by one component could be performed by other components. For example, the wagering game server 250 can also be configured to perform functions of the social networking module 263, and other network elements and/or system devices. For instance, the wagering game server 250 can communicate with the client 260 throughout a wagering game session and connect the wagering game player account to one of its social network accounts. The wagering game server 250 can control communications between the wagering game player account and a connected social network account during a wagering game session. The wagering game server 250 can also control communications between the wagering game player account and a machine-owned social network account, which represents a wagering game machine (e.g., the client 260 can be a wagering game machine in one embodiment) that the wagering game player account uses during the wagering game session.

Furthermore, the components shown may all be contained in one device, but some, or all, may be included in, or performed by, multiple devices as in the configurations shown in FIG. 2 or other configurations not shown. For example, the account manager 253 and the communication unit 254 can be included in the client 260 instead of, or in addition to, being a part of the wagering game server 250. Further, in some embodiments, the client 260 can determine wagering game outcomes, generate random numbers, etc., instead of, or in addition to, the wagering game server 250.

As mentioned previously, in some embodiments the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets, or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
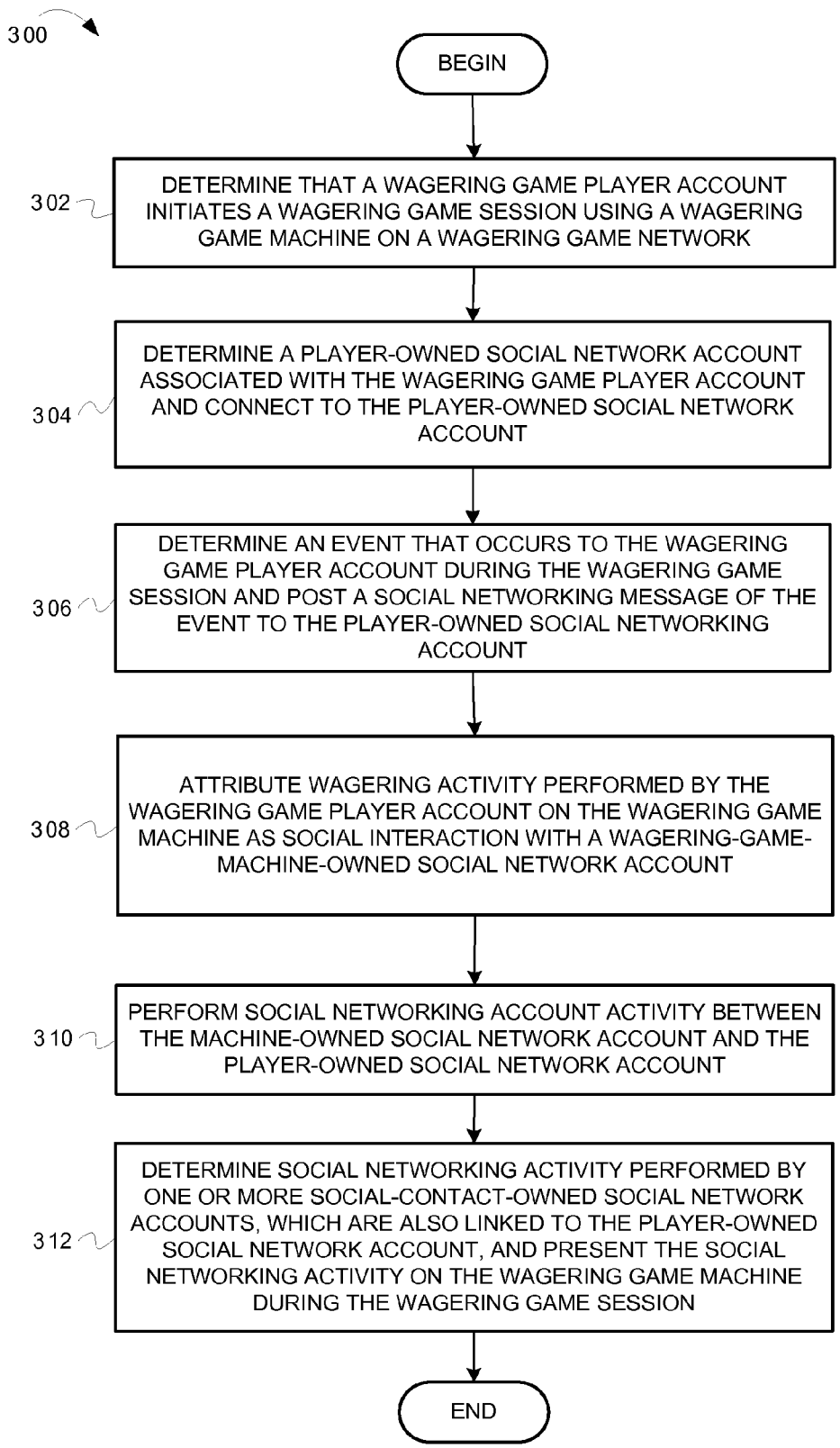
FIG. 3 is a flow diagram 300 illustrating integrating social networking interactions and wagering game systems, according to some embodiments.
Figure 4:
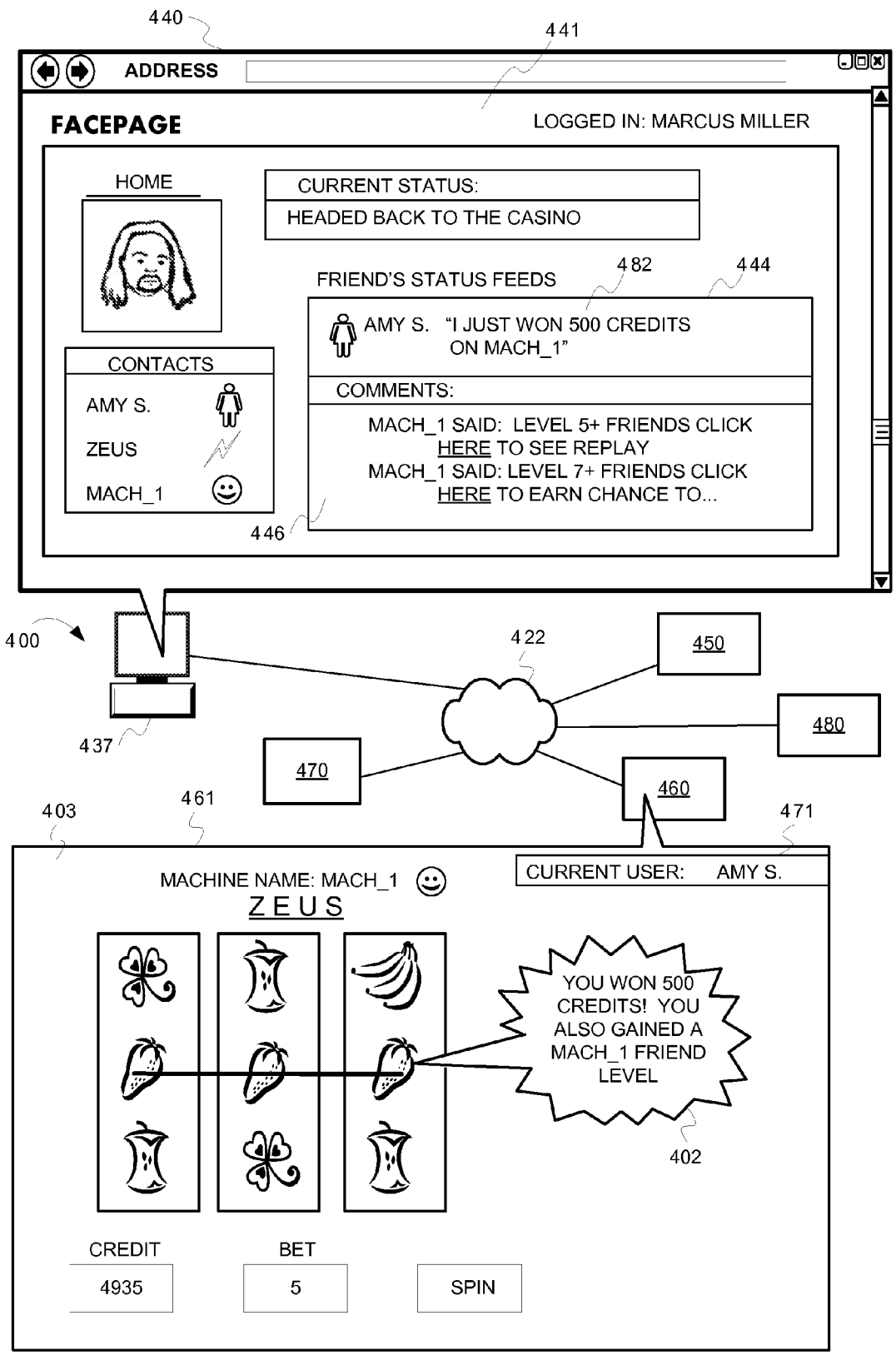
FIG. 4 is an illustration of controlling social networking interactions between player accounts and wagering game machines, according to some embodiments.
Figure 5:
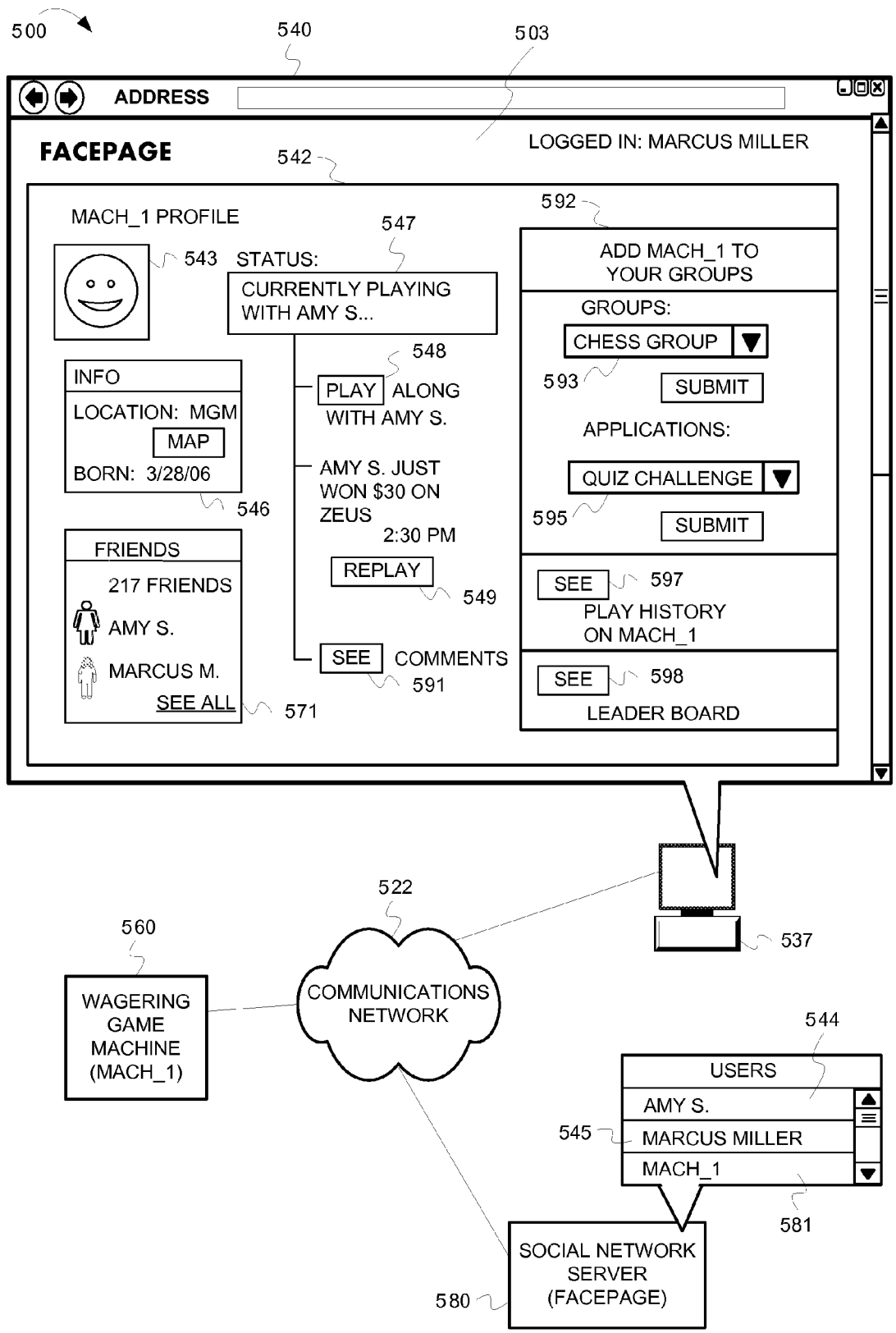
FIG. 5 is an illustration of controlling social network accounts for wagering game machines, according to some embodiments.

FIG. 3 is a flow diagram ("flow") 300 illustrating integrating social networking interactions and wagering game systems, according to some embodiments. FIGS. 1, 4, and 5 are conceptual diagrams that help illustrate the flow of FIG. 3, according to some embodiments. This description will present FIG. 3 in concert with FIGS. 1, 4 and 5. In FIG. 3, the flow 300 begins at processing block 302, where a wagering game system ("system") determines that a wagering game player account initiates a wagering game session using a wagering game machine on a wagering game network. The wagering game machine can include any of the wagering game machine types specified herein as well as other wagering game related devices that utilize or implement wagering game machines, such as a networked gaming table (e.g., a blackjack table, a poker table, etc.), a mobile gaming machine docking station, a gaming kiosk, etc.

The flow 300 continues at processing block 304, where the system determines a player-owned social network account associated with the wagering game player account and connects to the player-owned social network account. The player-owned social network account can be associated with a social network. In some embodiments, a wagering game server (or other device) on the wagering game network can access the wagering game player account and look for a listing of one or more listed social network accounts that belong to the wagering game player account. The wagering game server can select any one, or more, of the listed social network accounts. The listed social network accounts can be associated with social networks that are separate from the wagering game network. For example, the social networks can be hosted by social network servers separate from, and/or external to, the wagering game network. Nevertheless, a wagering game server (or other device) on the wagering game network can access the listed social network account using social-network-account logon information (e.g., a social networking website address, a user name, a password, etc.) stored in the wagering game player account. The wagering game server can use the social-network-account logon information to connect, or logon, to the player-owned social network account.

The flow 300 continues at processing block 306, where the system determines an event that occurs to the wagering game player account during the wagering game session and posts a social networking message of the event to the player-owned social networking account. In some embodiments, the event can be an achievement by the wagering game player account for a wagering game, an availability of a wagering game machine, feedback (e.g., humorous commentary) from the wagering game machine, etc. In one example, the event can specify that a wagering game machine (e.g., Zeus machine) is available and can notify players of the wagering game machine's availability. Further, the wagering game machine can notify a player's friends that a machine next to a player is open and can invite friends. FIG. 4 is an illustration of controlling social networking interactions between player accounts and wagering game machines, according to some embodiments. In FIG. 4, a wagering game system ("system") 400 includes a wagering game machine 460 connected to an account server 470, and a wagering game server 450 via a communications network 422. The wagering game machine 460 includes a wagering game display 461 that presents a wagering game 403. In the wagering game, a wagering game player account ("player account") 471 accomplishes a wagering game win. The wagering game machine 460 presents a congratulatory message 402 that indicates that the player account 471 wins a certain amount. The system 400 also includes a computer 437 connected a social network server 480 via the communications network 422. The computer 437 presents a web browser 440. The web browser 440 presents a social network website 441 hosted by the social network server 480. The system 400 transfers a message of the win to the social network server 480, which presents a status indicator comment 482 about the player account's win in a status feed console 444.

Returning to FIG. 3, the system can post the social networking message of the event according to a personality (e.g., aggressive, sophisticated, upbeat, etc.) that has been programmed into a wagering game machine. The wagering game machine can refer to personality rules that dictate a degree of friendliness, aggressive, or other personality behavioral traits. The system can provide options for an operator to set the wagering game machine's personality rules. The system can set the personality rules on other factors instead of, or in addition to, operator preferences, including, but not limited to, maintenance needs, locations in a casino, availability in a tournament, etc.

The system can post the social networking message using a social network messaging application for the social network. The system can provide the social networking message to the social network messaging application of the social network, and instruct the social network messaging application to transmit the social networking message. For example, the system can update a status on Facebook™, present a tweet on Twitter™, generate a comment on MySpace™, create a post on a blog website, or use any other social networking messaging mechanism available on social networking websites and their social communication applications.

In some embodiments, the social networking messaging application is provided by a social networking website, which the system can utilize directly and indirectly. For example, the system can plug in a version of the social network messaging application directly into a gaming application and use the plug-in to post comments directly to a social networking website. In other embodiments, however, the system can indirectly connect to the social networking website by sending instructions to a social network server to post the social networking message. The social network server can send a verification message to the wagering game player account to authorize the posting of the message before the message is posted. For example, the social network server can send a verification text message to a player's cell phone to verify, or authorize, access by the wagering game machine and/or to enable posting activity. If the player authorizes the access, the player's cell phone can return an authorization message, which the social network server can then use as authorization to post the message on the social networking website.

In some embodiments, the system can store and use player-configured event-posting settings that report, or filter, different types of events. The types can refer to win levels, subject matters, game themes, or any other discernible property or characteristic of the event. The system can determine an event type associated with the event and determine that the event type complies with the player-configured event-posting settings. The system can then generate the social networking message of the event, and present the social networking message on the social network. In some embodiments, the system can store the player-configured event-posting settings with a social network messaging application, with the wagering game player account, or with the player-owned social network account.

In some embodiments, the system can also provide a selectable object (e.g., a link, a button, a video player, etc.), along with the social networking message, that will present a replay of the event when a user selects (e.g., clicks on) the selectable object. In some embodiments, the system can receive comments from social networking contacts associated with the social network account and communicate the comments to the wagering game network to present on a wagering game machine associated with the wagering game session. In another example, the system can incorporate the comments into the wagering game (e.g., present the comments on the reels, include images of social networking contacts who made the comments, etc.). Additionally, the system can reward friends for commenting. In some embodiments, the system can receive comments from a wagering game player account, via the wagering game machine, and post those comments using the social network messaging application.

The flow 300 continues at processing block 308, where the system attributes wagering game activity performed by the wagering game player account on the wagering game machine as social interaction with a machine-owned social network account. In some embodiments, the system can first link the wagering-game-machine-owned (machine-owned) social network account to the player-owned social network account, as exemplified in FIG. 5. FIG. 5 is an illustration of controlling social network accounts for wagering game machines, according to some embodiments. In FIG. 5, a wagering game system ("system") 500 includes a computer system 537 connected to a social network server 580 via a communications network 522. The system 500 also includes a wagering game machine 560. The wagering game machine 560 can have identifying information (e.g. a machine name, "Mach_1," an avatar 543, etc.) that the system 500 uses to sign-up the wagering game machine 560 for a social network account 581 hosted by the social network server 580. The social network server 580 can host a social networking website 503 as well as other social network accounts 544 (for a user, Amy S.) and 545 (for a user, Marcus Miller). The computer 537 can present the social networking website 503 in a web browser 540. The social networking website 503 can present a social network profile 542 for the social network account 581. The social network account 581 may also be referred to as a "machine-owned" social network account 581 because it belongs to, or is owned by, the wagering game machine 560. The social network accounts 544, 545 may be referred to as "player-owned" social network accounts 544, 545 because they belong to, or are owned by, wagering game player accounts. The social networking website 503 can present the machine-owned social network account 581 as a linkable social contact (e.g., a friend, a contact, a follower, etc.), on the social networking website 503. The system 500 can link the machine-owned social network account 581 to the player-owned social network accounts 544, 545 using a social-contact linking feature from a social network application (e.g., a linked friends feature 571) on the social networking website 503. Some examples of linking features on some known social network websites include the friend connection feature for Facebook™ and the follower subscription feature for Twitter™. In some embodiments, the system 500 can link, for example, the player-owned social network account 545, for the user Marcus Miller, to the machine-owned social network account 581, without any required social interaction by the user Marcus Miller, or by Marcus Miller's wagering game player account, other than a request by Marcus Miller to link the to the machine-owned social network account 581. In some embodiments, however, the system 500 may require a certain level of activity or social interaction before the system links the player-owned social network account 545 to the machine-owned social network account 581. For example, system 500 may only perform the link if the user Marcus Miller logs on to the wagering game machine 560, using a wagering game player account and plays (i.e., places a wager) on the wagering game machine 560.

Returning to FIG. 3, in some embodiments, a wagering game machine can have a programmed personality which the wagering game machine use to perform social interactions with the wagering game player, social network accounts, etc. For example, the wagering game machine can appear to feel bad and possibly de-friend a social contact account for neglecting it or for playing on other wagering game machines.

In some embodiments, the system can detect a pre-defined wagering activity by a wagering game player account and use it as a measure of social interaction with the wagering game machine, establish a level of social status, or in other words, build a friendship, with the wagering game machine. For example, in FIG. 4, the system 400 can determine a significance metric, or degree of significance (e.g., significance in value, amount, duration, etc.), for the wagering activity. The system 400 can determine whether the significance metric of the wagering activity (e.g., the wagering game win amount) meets one or more pre-defined levels of social interaction for the wagering game machine 460. The pre-defined levels of social interaction can be related to level of social status to the wagering-game-machine-owned social network account. If the wagering activity meets the pre-defined levels of social interaction, the wagering game machine 460 can assign (i.e., increase) a level of social status, or friendship level, for a social network account associated with the player account (i.e., increase a friendship level for Amy S.'s Facepage account because Amy S.'s player account, player account 471, won, as indicated in the congratulatory message 402). Other examples may include increasing a level of social status if the player account 471 pays a certain amount of money on the wagering game machine 460 over time, increasing a level if the player recruits a certain number of friends to play the wagering game machine 460, and so forth.

In some embodiments, the system 400 can attribute the social interaction with the wagering game machine by providing social network benefits, or rewards, associated with a machine-owned social network account. For instance, as indicated in a comments section 446, the system 400 can reward a player-owned social network account with benefits (e.g., a video replay of Amy S.'s win for any social network account that has a friendship level of "5" or above) for the social interaction performed by the player account 471 with the wagering game machine 460. In other examples, the system 400 can provide monetary awards (e.g., spins, coins, credits, etc.) and/or non-monetary awards (e.g., sweepstakes entries, points, coupons, links to new friends, invitations to join groups, etc.). In some embodiments, the system 400 can provide reward for varying levels of social interaction performed by a wagering game player account. The system 400 can increase the rewards in value as the wagering game player account reaches higher levels of social interaction with the wagering game machine 460. Therefore, in some embodiments, the more the wagering game player account plays on the wagering game machine 460, the more the system 400 will rewards the wagering game player account or a player-owned social network account associated with the wagering game player account.

Returning to FIG. 3, in some embodiments, the wagering game player account can link or introduce friends to the wagering game machine. The system can reward friends for making introductions as well as for recruiting others to link to the wagering game machine's social network account. For instance, the system can reward introductions or links by making the linked friends eligible to be integrated into wagering game play (e.g., via a reel element substitution). In some embodiments, the system can provide social networking awards that affect the player-owned social network account on the social network and/or provide gaming awards that affect the wagering game player account on the wagering game network.

The flow 300 continues at processing block 310, where the system performs social networking account activity between the machine-owned social network account and the player-owned social network account. In some embodiments, the system performs the social networking account activity on behalf of the wagering game machine. A casino-controlled device (e.g., the wagering game machine, a wagering game server, an account server, etc.) can be programmed to perform social networking account activity for the machine-owned social network account. In some embodiments, the casino-controlled device works in conjunction with a social network server and/or a social network application on the social network server that receives instructions from the casino-controlled device to perform the social networking account activity on the social network server. The system can socially communicate with the machine-owned social network account, with any linked social network accounts of the machine-owned social network account (i.e., the player-owned social network account), or with any other social network account with which the social network allows communication (e.g., social-network contacts of the player-owned social network account). The system can post comments on social network websites using social networking communication features (e.g., Facebook™ comments, Twitter™ tweets, Blogger™ posts, etc.). The wagering game machine can have identifying information (e.g. a machine name, an avatar, etc.) assigned to it, which the system can use to perform social activities on behalf of the wagering game machine (e.g., post an avatar on machine-owned social networking profiles, use a machine name to identify social networking communications made by the machine-owned social network account, etc.). For example, in FIG. 5, the system 500 can present a status message 547 about what the wagering game machine 560 is doing (e.g., playing a game with Amy S.). The social network account 544 can read the status message 547 from the social network profile 542 for the social network account 581 when the social network account 544 logs on to the social network website 503.

In some embodiments, the system can perform the social networking account activity using social network applications and features on a social networking website and/or by sponsoring a social networking application on the social networking website. For example, in FIG. 5, the system 500 can utilize a comments feature 591 for the social network website. In another embodiment, the system 500 can integrate with social network applications indicated in an applications console 592, or elsewhere on the social network website 503. The social network applications can provide levels of benefits (e.g. levels of information, access, rewards, privileges, etc.) for the social network applications. For example, the system 500 can make friend's accounts (i.e., social contact accounts linked to a player-owned social network account) eligible to win sweepstakes offered by a sweepstakes application on the social networking website 503. In another example, the system 500 can present statistics in a statistical or information application or features. For instance, the system 500 can determine statistics for the wagering game machine 560, such as a popularity of the wagering game machine by all players or, specifically, by one or more linked social network accounts that are linked to the machine-owned social network account 581. The system 500 can review a machine's play history (e.g., review who has played the wagering game machine and when), and submit the play history to a popularity-tracking social network application 597 that can list the popularity of the wagering game machine 560 based on the play history. The system can also compare an individual player's history to other players' histories to generate a comparison of the popularities among individual players. The system 500 can submit the comparison to the popularity-tracking social network application 597 to present on the social network website 503. In yet another example, the system 500 can control a leader board application 598 that posts rankings of players that are performing in a gaming tournament. In another example, the wagering game machine can report information to groups 593 using group applications 595 that feed to groups of users (e.g., send a picture of a player at the wagering game machine 560 to a group of friends using a picture sharing application). Further, the wagering game machine 560 can post videos of player activities (e.g., replays, wins, etc.) using a video sharing application 549.

In some embodiments, the system 500 can present descriptive information 546 of the wagering game machine's location, history, statistics, or other properties and characteristics (e.g., how to access a wagering game machine, what the wagering game machine is paying out, etc). The descriptive information 546 can include a map application that shows a map graphic depicting the descriptive information 546.

In some embodiments, the system 500 can provide levels of benefits to the social networking applications based on degrees of wagering activity. For example, the system 500 can require that a player perform certain activities using the wagering game machine 560, or on different wagering game machines (e.g., require that the player play games at different locations, on different wagering game machines), to unlock a game application 548. The social networking website 503 and the wagering game machine 560 can report player activities and accomplishments back and forth to each other to update the game application 548 and unlock access to the game application 548, or access to different levels of the game application 548, once the player performs the activities.

The flow 300 continues at processing block 312, where the system determines social networking activity performed by one or more social-contact-owned social network accounts, which are linked to the player-owned social network account, and presents the social networking activity on the wagering game machine during the wagering game session. In some embodiments, the system can monitor the player-owned social network account for social networking communications from one or more social-contact-owned social network accounts ("friend accounts") associated with the player-owned social network account. The friend accounts can send the social networking communications using social networking communication features of the social networking website. The system can format the social networking communication for presentation on the wagering game machine, and present the communication on the wagering game machine (see FIG. 1 for an example of the system 100 presenting the comment feature 143 by the social network account 144 on the comment application 108 on the wagering game machine 160). In some embodiments, the system can present the social networking communication as part of the wagering game.

In some embodiments, the system can use social networking activity by friend accounts to affect or control the wagering game player account associated with the player-owned social contact account. For example, the system can use instructions indicated in friend accounts' comments to influence a gaming effect during the wagering game player account's wagering game session. In some embodiments, instructions indicated in friend accounts' comments can indicate likes, dislikes, preferences, or some other voting feature related to the wagering game session that would specify what the wagering game player account should do during the wagering game session (e.g., vote for the player to bet more, vote for the player to bet more lines, vote for the player to select a specific item, vote for the player to stop a reel at a certain time, etc.). The system can present the results of the vote on a display on a wagering game machine that the wagering game player account is using during the wagering game session. In some embodiments, the wagering game player account can authorize the system to enforce the results of the vote (e.g., authorize the wagering game machine to bet for the wagering game player account based on audience vote).

In some embodiments, the system can provide rewards to the friend accounts if the social networking communication is presented on the wagering game machine. For example, if a social-contact-owned social network account (i.e., a friend account) makes a comment for the player-owned social network account, the system can make the friend account eligible to be integrated into the game or be eligible for some reward. If the friend account also owns a wagering game player account, the system can make the friend account's player account eligible to receive rewards on the wagering game network.

In another example, the system can provide rewards to the wagering game player account (e.g., a promotion, a privilege, etc.) based on an amount of social networking communication received by friend accounts during the wagering game session. For example, the system can present a stacked wilds feature, which grants the wagering game player account eligibility for more wilds based on the amount of social networking activity (e.g., for every ten friend account comments, the system makes the wagering game player account eligible for another wild). In another example, the system can provides opportunities for a player to increase their chances of receiving a bonus reward or performing better in a bonus game or a wagering game (e.g., a better chance of continuing a cascade, a better chance of getting a multiplier, etc.) based on an amount of social networking communications by friend accounts.

Additional Example Operating Environments

This section describes example operating environments, systems and networks, and presents structural aspects of some embodiments.

Wagering Game Computer System

Figure 6:
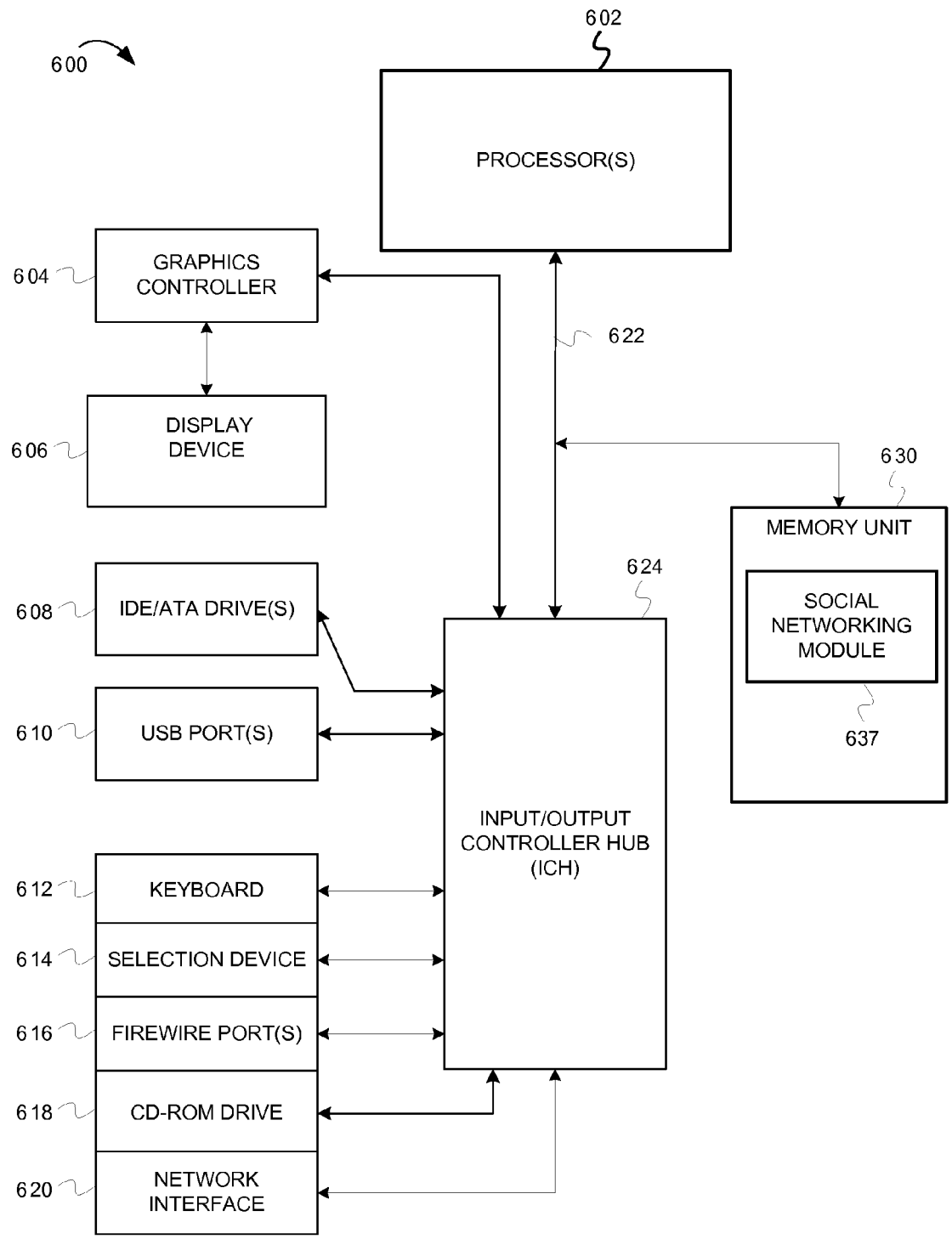
FIG. 6 is an illustration of a wagering game computer system 600, according to some embodiments.

FIG. 6 is a conceptual diagram that illustrates an example of a wagering game computer system 600, according to some embodiments. In FIG. 6, the computer system 600 may include a processor unit 602, a memory unit 630, a processor bus 622, and an Input/Output controller hub (ICH) 624. The processor unit 602, memory unit 630, and ICH 624 may be coupled to the processor bus 622. The processor unit 602 may comprise any suitable processor architecture. The computer system 600 may comprise one, two, three, or more processors, any of which may execute a set of instructions in accordance with some embodiments.

The memory unit 630 may also include an I/O scheduling policy unit 6 and I/O schedulers 6. The memory unit 630 can store data and/or instructions, and may comprise any suitable memory, such as a dynamic random access memory (DRAM), for example. The computer system 600 may also include one or more suitable integrated drive electronics (IDE) drive(s) 608 and/or other suitable storage devices. A graphics controller 604 controls the display of information on a display device 606, according to some embodiments.

The input/output controller hub (ICH) 624 provides an interface to I/O devices or peripheral components for the computer system 600. The ICH 624 may comprise any suitable interface controller to provide for any suitable communication link to the processor unit 602, memory unit 630 and/or to any suitable device or component in communication with the ICH 624. The ICH 624 can provide suitable arbitration and buffering for each interface.

For one embodiment, the ICH 624 provides an interface to the one or more IDE drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable medium that stores a set of instructions (e.g., software) embodying any one, or all, of the methodologies for integrating social networking and wagering systems. Furthermore, software can reside, completely or at least partially, within the memory unit 630 and/or within the processor unit 602. The computer system 600 can also include a social networking module 637. The social networking module 637 can process communications, commands, or other information, to integrate social networking and wagering systems. Any component of the computer system 600 can be implemented as hardware, firmware, and/or machine-readable media including instructions for performing the operations described herein.

Wagering Game Machine Architecture

Figure 7:
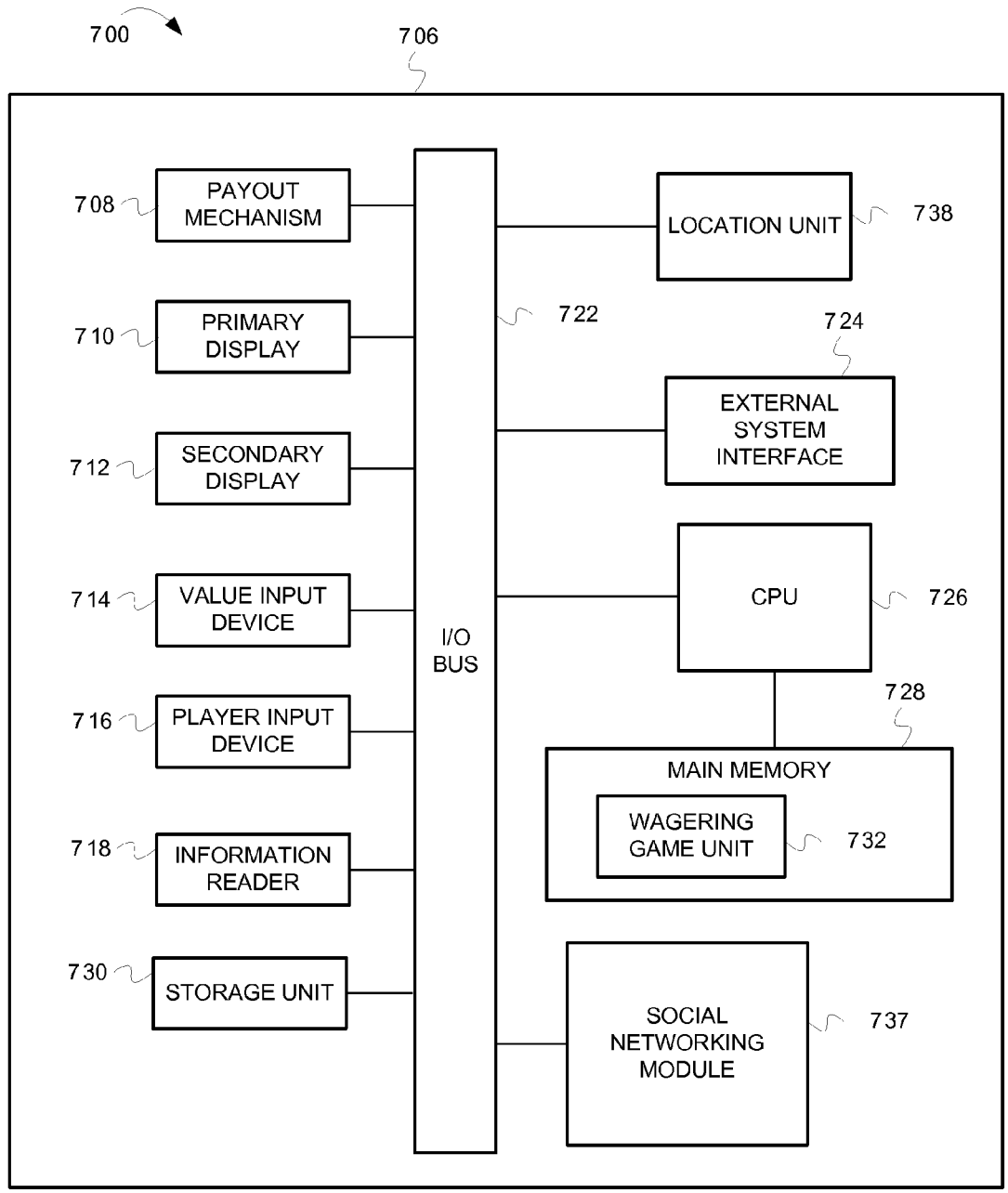
FIG. 7 is an illustration of a wagering game machine architecture 700, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video black jack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes a social networking module 737. The social networking module 737 can process communications, commands, or other information, where the processing can integrate social networking and wagering systems.

Furthermore, any component of the wagering game machine 706 can include hardware, firmware, and/or machine-readable media including instructions for performing the operations described herein.

Wagering Game Machine

Figure 8:
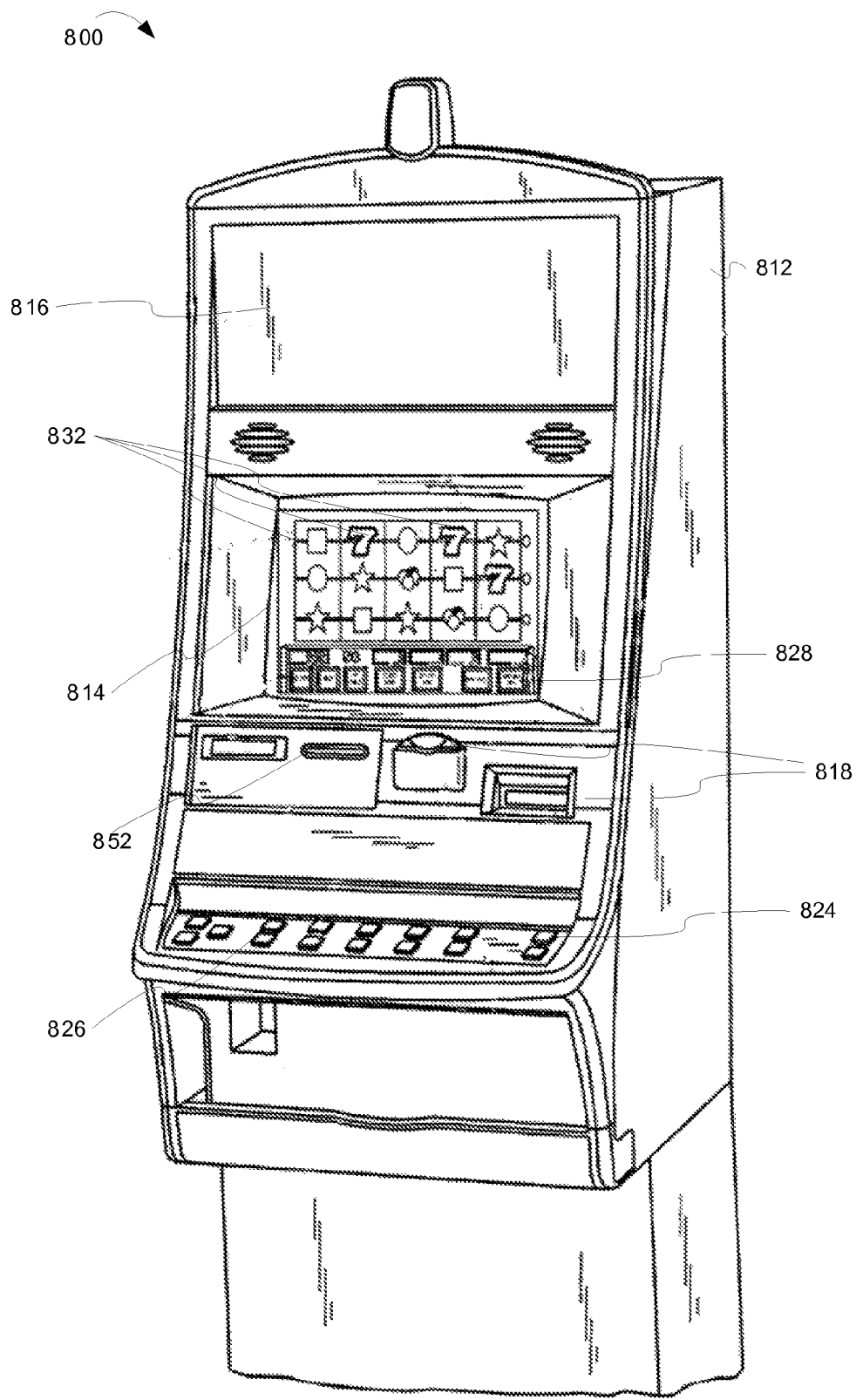
FIG. 8 is an illustration of a wagering game machine 800, according to some embodiments.

FIG. 8 is a conceptual diagram that illustrates an example of a wagering game machine 800, according to some embodiments. Referring to FIG. 8, the wagering game machine 800 can be used in gaming establishments, such as casinos. According to some embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bar top model, mobile handheld model, or workstation console model.

A player begins playing a basic wagering game by making a wager via the value input device 818. The player can initiate play by using the player input device's buttons or touch screen 828. The basic game can include arranging a plurality of symbols along a pay line 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:
  connecting, via a network communication interface device, a social network account with a wagering game player account, wherein the wagering game player account is associated with a wagering game session hosted by a gaming server, and wherein the social network account is associated with a social networking session hosted by a social network server;
  detecting, via the network communication interface device, a first electronic event transmitted via a communications network from a first of the social network server and the gaming server, wherein the first electronic event occurs in a first of the social networking session and the wagering game session;

determining, via analysis of the first electronic event by at least one electronic processor unit, a first significance value associated with the first electronic event; and after determining the first significance value, instructing, via the communications network, a second of the gaming server and the social network server to cause a second electronic event to occur for a second of the social networking session and the wagering game session, wherein the second electronic event has a second significance value proportional to the first significance value.

2. The method of claim 1 further comprising:

after detecting the first electronic event, determining that the first electronic event is related to the second of the social networking session and the wagering game session; and wherein the instructing the second of the gaming server and the social network server to cause the second electronic event to occur is in response to the determining that the first electronic event is related to the second of the social networking session and the wagering game session.

3. The method of claim 1, wherein the connecting the social network account with the wagering game player account comprises accessing connection information stored in the wagering game player account, wherein the connection information is configured to authorize access to the social network account.

4. The method of claim 1 further comprising:

computing, via the at least one electronic processor unit, the second significance value to be proportional to the first significance value associated with the first electronic event; and instructing the second of the gaming server and the social network server to assign to the second electronic event the second significance value.

5. The method of claim 4, wherein the determining the first significance value associated with the first electronic event comprises determining a degree of significance for a wagering game achievement that occurs during the wagering game session in response to wagering activity, and wherein the instructing the second of the gaming server and the social network server to assign the second significance value to the second electronic event comprises instructing the second of the gaming server and the social network server to assign a digital value of a reward for the social network account proportional to the degree of significance for the wagering game achievement.

6. The method of claim 1, wherein the first electronic event occurs in response to user input associated with the social network account during the social networking session, and wherein the first electronic event comprises instructions indicated in a social comment to influence a gaming effect to be performed during the wagering game session.

7. The method of claim 1, wherein the second electronic event occurs in a wagering game associated with the wagering game session, and wherein the second electronic event comprises one or more of incorporating social comments into a game play element of the wagering game, increasing a value in the wagering game, influencing a gaming effect in the wagering game, and including an image of the social network account as part of the wagering game.

8. The method of claim 1, wherein the first electronic event occurs in response to user input associated with the wagering game player account in the wagering game session, and wherein the second electronic event comprises one or more of, providing a reward to the social network account, or linking the social network account to another social network account via the communications network.

9. One or more non-transitory, machine-readable storage media having instructions stored thereon, which when executed by a set of one or more electronic processor units of a first device cause the set of one or more electronic processor units to perform operations comprising:

connecting a social network account with a wagering game player account via a communications network, wherein the wagering game player account is associated with a wagering game session hosted by a second device, and wherein the social network account is associated with a social networking session hosted by the first device;

detecting, via a network communication interface of the first device, a first electronic event transmitted via the communications network from the second device;

determining, via analysis of the first electronic event by the first device, a degree of significance associated with the first electronic event; and after detecting the first electronic event, instructing the second device to generate a second electronic event that digitally associates the social network account with a wagering game according to the degree of significance associated with the first electronic event.

10. The one or more non-transitory, machine-readable storage media of claim 9 further comprising:

determining that the social network account is associated with the wagering game player account, and wherein the instructing the second device to generate the second electronic event is in response to the determining that the social network account is associated with the wagering game player account.

11. The one or more non-transitory, machine-readable storage media of claim 9, wherein the determining the degree of significance associated with the first electronic event comprises determining a first significance value associated with the first electronic event and wherein the instructing the second device to generate the second electronic event comprises instructing the second device to assign a second significance value, proportional to the first significance value, to the second electronic event.

12. The one or more non-transitory, machine-readable storage media of claim 9, wherein the first electronic event occurs in response to user input associated with the social network account during the social networking session, and wherein the first electronic event comprises one or more of voting performed by the social network account about the wagering game session.

13. The one or more non-transitory, machine-readable storage media of claim 9, wherein the instructing the second device to generate the second electronic event comprises:

instructing the second device to, based on an activity performed by the social network account in the social networking session, generate the second electronic event to cause one or more of placing a bet for the wagering game player account in the wagering game, changing wagering game functionality in the wagering game, providing a wagering game feature in the wagering game, providing a secondary game feature associated with the wagering game, increasing chances of receiving a bonus reward in the wagering game, or increasing chances of performing better in the wagering game.

14. A gaming system comprising:

one or more processors;

a network communication interface configured to communicate via a communications network; and one or more memory storage devices configured to store instructions, which when executed by at least one of the one or more processors, cause the gaming system to perform operations to
  connect a social network account with a wagering game player account via the communications network, wherein the wagering game player account is associated with a wagering game session hosted by the gaming system, and wherein the social network account is associated with a social networking session hosted by social network server,
  detect, via the network communication interface, a first electronic event transmitted via the communications network from the social network server,
  determining, via analysis of the first electronic event, a first significance value associated with the first electronic event; and
  after determining the first significance value, instruct, via the communications network, the social network server to generate a second electronic event to award the social network account according to the first significance value associated with the first electronic event.

15. The gaming system of claim 14, wherein the one or more memory storage devices are configured to store instructions, which when executed by at least one of the one or more processors, cause the gaming system to further perform operations to:
  determine that the social network account is associated with the wagering game player account,
  in response to determination that the social network account is associated with the wagering game player account, access connection information stored in the wagering game player account, wherein the connection information is configured to authorize access to the social network account, and
  use the connection information to access the social network account.

16. The gaming system of claim 14, wherein the first electronic event occurs in response to user input associated with the wagering game player account in the wagering game session, and wherein the second electronic event comprises one or more of unlocking access to a game application accessible via the social network server, providing access to different levels of a game application accessible via the social network server, making the social network account eligible to win a sweepstakes offer, making the social network account eligible for a reward, or making the social network account eligible to be integrated as a participant into a wagering game.

17. A gaming apparatus comprising:
  one or more processors;
  a network communication interface; and
  one or more memory storage devices configured to store instructions, which when executed by at least one of the one or more processors, cause the gaming apparatus to
    connect a social network account with a wagering game player account via a communications network, wherein the wagering game player account is associated with a wagering game session hosted by the gaming apparatus, and wherein the social network account is associated with a social networking session hosted by a social network server,
    generate a first electronic event for a wagering game achievement that occurs during the wagering game session,
    determine, via analysis of the first electronic event, a degree of significance of the wagering game achievement, and
    instructing the social network server to generate a second electronic event to reward the social network account proportional to the degree of significance of the wagering game achievement.

18. The gaming apparatus of claim 17, wherein the wagering game session is not hosted by the social network server.

19. The gaming apparatus of claim 17, wherein the social network account represents the gaming apparatus as a social contact.

20. The one or more non-transitory, machine-readable storage media of claim 9, wherein the instructing the second device to generate the second electronic event comprises:
  instructing the second device to, based on an activity performed by the social network account in the social networking session, generate the second electronic event to cause one or more of incorporating social comments into a game play element of the wagering game, increasing a value in the wagering game, influencing a gaming effect in the wagering game, incorporating an indicia of the social network account as a game play element of the wagering game, or making the social network account eligible to be integrated as a participant into a wagering game.

21. The gaming system of claim 14, wherein the first electronic event occurs in response to user input associated with the wagering game player account in the wagering game session, and wherein the second electronic event comprises one or more of increasing a level of benefits for the social network account, increasing a level of access for the social network account, increasing a value of a reward for the social network account, and increasing a level of privileges for the social network account.

* * * * *